(12) United States Patent
Valovick (10) Patent No.: US 7,744,474 B2
(45) Date of Patent: Jun. 29, 2010

(54) PROPSHAFT ASSEMBLY WITH STIFFENING RING AND SEAL

(75) Inventor: Brian Valovick, Royal Oak, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 254 days.

(21) Appl. No.: 11/386,602

(22) Filed: Mar. 22, 2006

(65) Prior Publication Data

US 2007/0225082 A1    Sep. 27, 2007

(51) Int. Cl.
*F16C 3/03* (2006.01)

(52) U.S. Cl. .................. 464/162; 464/175; 277/912

(58) Field of Classification Search ........... 464/162, 464/173–175; 277/500, 912; 403/359.1–359.6; 248/62, 74.1–74.3; 285/913, 914
See application file for complete search history.

(56) References Cited

U.S. PATENT DOCUMENTS

| | | | | |
|---|---|---|---|---|
| 3,287,031 A | * | 11/1966 | Simmons et al. ............ | 285/914 |
| 3,556,273 A | * | 1/1971 | Neuweier | |
| 4,153,260 A | * | 5/1979 | Joyner ......................... | 277/500 |
| 4,807,351 A | * | 2/1989 | Berg et al. ............ | 403/359.6 X |
| 5,544,849 A | * | 8/1996 | Peterson et al. ............ | 248/74.1 |
| 6,193,612 B1 | * | 2/2001 | Craig et al. .................. | 464/162 |
| 6,241,616 B1 | * | 6/2001 | Lightcap ..................... | 464/162 |

FOREIGN PATENT DOCUMENTS

| | | | | | |
|---|---|---|---|---|---|
| DE | 1 808 076 | * | 8/1969 | .................. | 464/162 |
| GB | 771968 | * | 4/1957 | .................. | 285/914 |

* cited by examiner

*Primary Examiner*—Greg Binda
(74) *Attorney, Agent, or Firm*—Jennifer M. Brumbaugh; Mick A. Nylander (57) ABSTRACT

A propshaft assembly has an inner tube, an outer tube having an end splined to the inner tube thereby defining an engagement area between the inner tube and the outer tube. The propshaft assembly also includes at least one stiffening ring disposed around the outer tube. At least a portion of the stiffening ring is in contact with the outer tube.

19 Claims, 7 Drawing Sheets

PROPSHAFT ASSEMBLY WITH STIFFENING RING AND SEAL

TECHNICAL FIELD

The present invention relates to a propshaft assembly and more particularly to a propshaft assembly having a stiffening ring that includes at least a stiffening portion and optionally a seal portion.

BACKGROUND

In most conventional vehicles a vehicle driveshaft or propeller shaft (propshaft) transmits torque from the transmission through a differential to the wheels of the vehicle. The propshaft typically utilizes a pair of splined members that are commonly referred to as a "slip yoke" (outer tube) and a "yoke shaft" (inner tube). The inner tube has a splined outer surface and the outer tube has a splined inner surface. In one example, the inner tube is selectively inserted into the outer tube such that the splines of the outer tube mate with the splines of the inner tube. Such mating may be of an interference or slip fit nature. As a result of this mating, rotational energy from the outer tube may be transmitted to the inner tube or vice versa. The inserted relationship between the tubes also allows for some telescoping movement between the outer tube and the inner tube under certain operational or load conditions.

Various methods are available for forming a spline configuration on the inside surface of the outer tube and the outside surface of the inner tube. One method is to machine the spline configuration into the inner or outer surface of the tubes. Such a method, however, typically requires excess material. Another available method is to use a forming method, such as extrusion, to shape the material of the outer tube or inner tube into its splined configuration. The result of such a forming method is that, for each tube, both the inside and outside surfaces have a splined configuration. Additionally, due to the forming operation, the overall wall thickness for each tube is reduced. Such reduction in thickness causes the mating areas between the inner and outer tube to expand after repeated torsional fatigue loading and to wobble or become out-of-round under load or during operation.

SUMMARY

A propshaft assembly having an inner tube, an outer tube having an end splined to the inner tube thereby defining an engagement area between the inner tube and the outer tube, and at least one stiffening ring disposed around the outer tube. At least a portion of the stiffening ring is in contact with the outer tube.

BRIEF DESCRIPTION OF THE DRAWINGS

The invention will now be described, by way of example, with reference to the accompanying drawings, in which.

DETAILED DESCRIPTION

Figure 1:
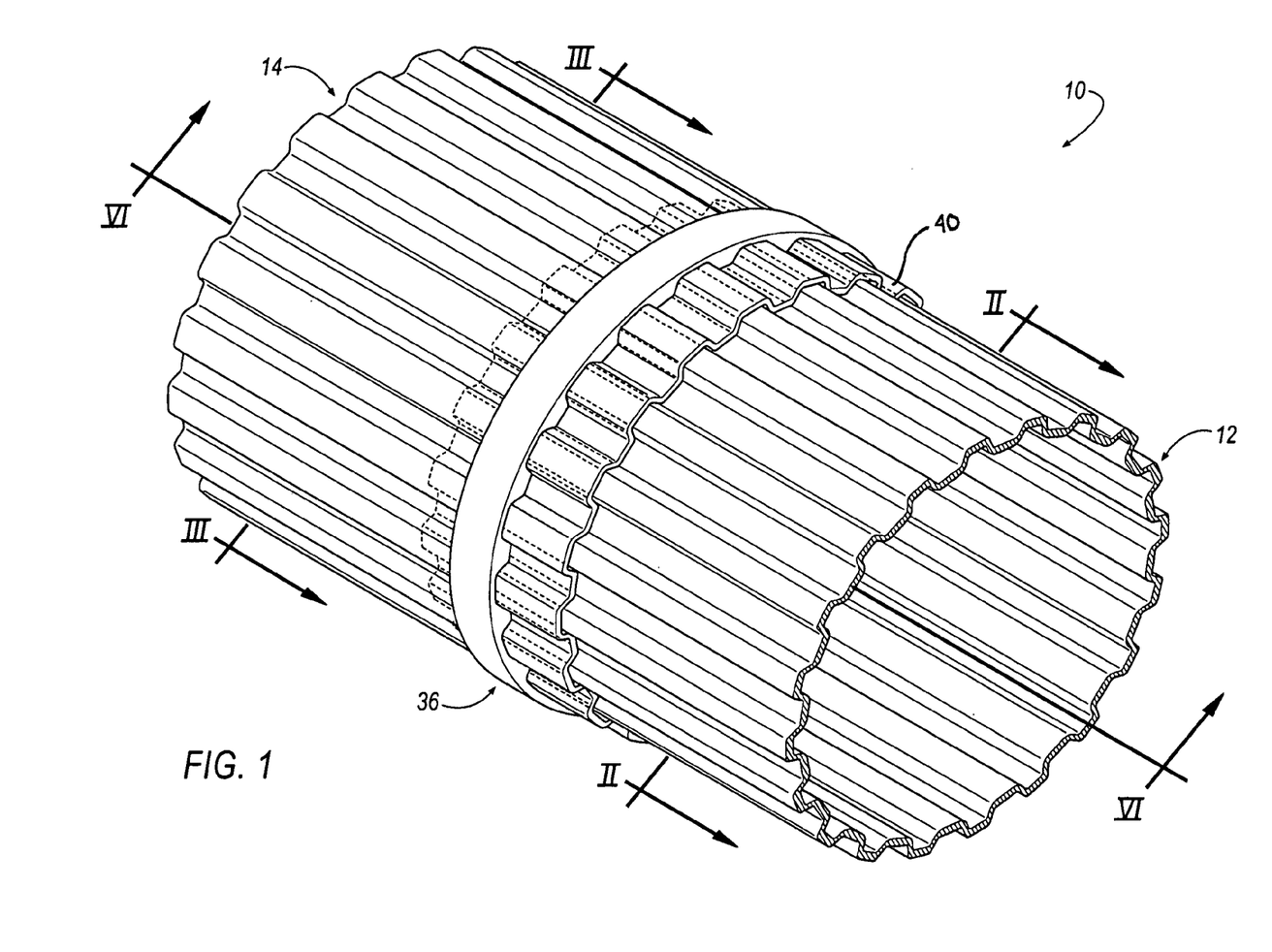
FIG. 1 is a perspective view of a portion of a propshaft assembly according to an embodiment of the invention.

Referring now to FIG. 1, a propeller shaft or propshaft assembly 10 is shown according to an embodiment of the invention. In general, the propshaft assembly 10 includes a first generally round and/or tubular male or inner tube 12, and a second-generally round and/or tubular female or outer tube 14. A stub shaft (not shown) can be fixedly attached to an end of the inner tube 12 and a stub shaft can be fixedly attached to an end of the outer tube 14. Alternatively, one or both of the stub shafts can be replaced with a conventional flange or yoke (not shown). One skilled in the art will readily recognize other variations to the configurations of the inner tube 12 and outer tube 14. In one embodiment, the inner and outer tubes 12, 14 are formed from cylindrical tubes and can be manufactured from any suitable conventional materials, such as commercially available low carbon alloy steel, lightweight aluminum, or the like.

Figure 2:
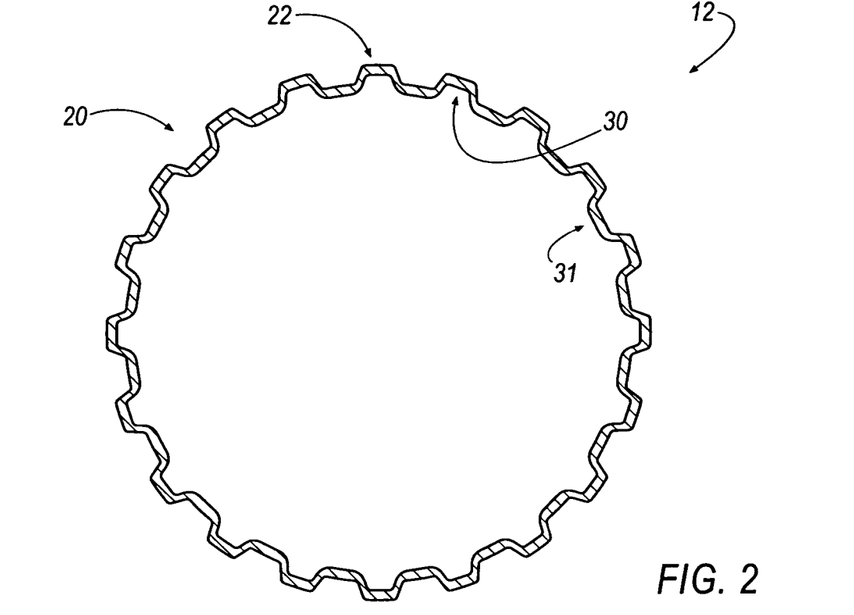
FIG. 2 is a cross-sectional view of a portion of the propshaft assembly of FIG. 1 taken along line II-II according to an embodiment of the invention.
Figure 3:
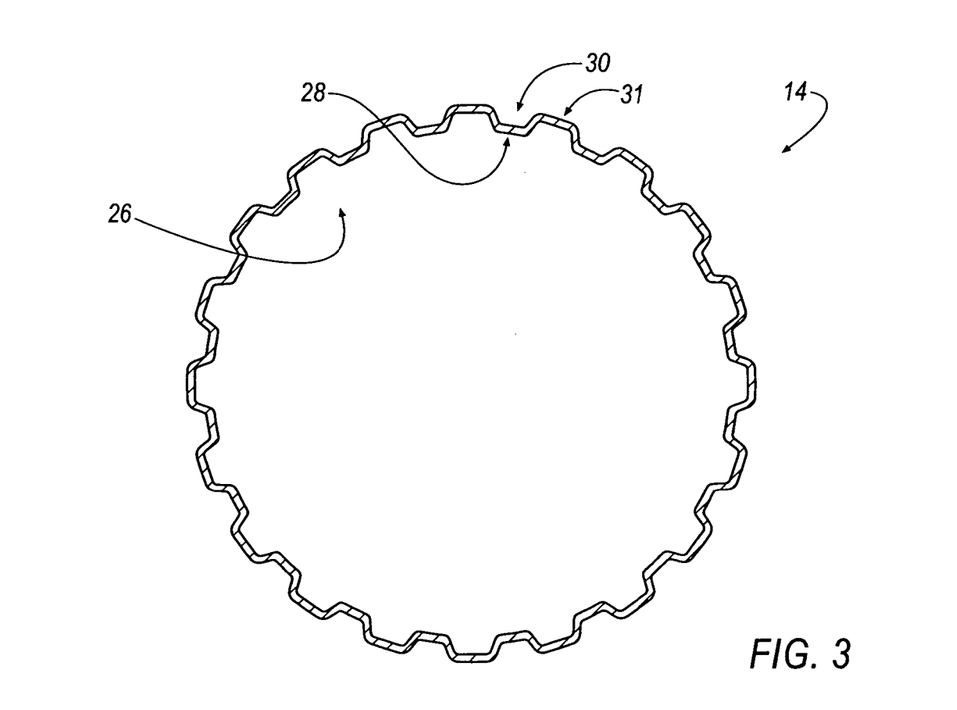
FIG. 3 is a cross-sectional view of a portion of the propshaft assembly of FIG. 1 taken along line III-III according to an embodiment of the invention.

As shown in FIG. 2, which is a cross-sectional view along line II-II in FIG. 1, the male or inner tube 12 includes a splined portion 20 with a plurality of outwardly projecting splines 22 that are circumferentially formed upon the inner tube 12. Similarly, as shown in FIG. 3, which is a cross-sectional view along line III-III in FIG. 1, the female or outer tube 14 includes a splined portion 26 with a plurality of internally projecting splines 28 that are circumferentially formed upon the outer tube 14. In one embodiment, the exterior surface of the outer tube 14 includes indentations 30 and ridges 31 that substantially correspond to the geometry of the splines 28. More specifically, where a spline 28 is formed on the splined portion 26, a corresponding indentation is formed on the outer surface of the outer tube 14. Likewise, the inner tube 12 may also include indentations 30 and ridges 31 on its inside surface that substantially correspond to the geometry of the splines 22. However, one skilled in the art will readily recognize alternate configurations for the inner tube 12 and outer tube 14. Such alternate configurations may include inner tube 12 having a solid interior, outer tube 14 having a smooth outer surface, or inner tube 12 having an inside diameter that is smooth or that does not have a geometry of indentations 30 or ridges 31 that correspond to the splines 22.

Figure 4:
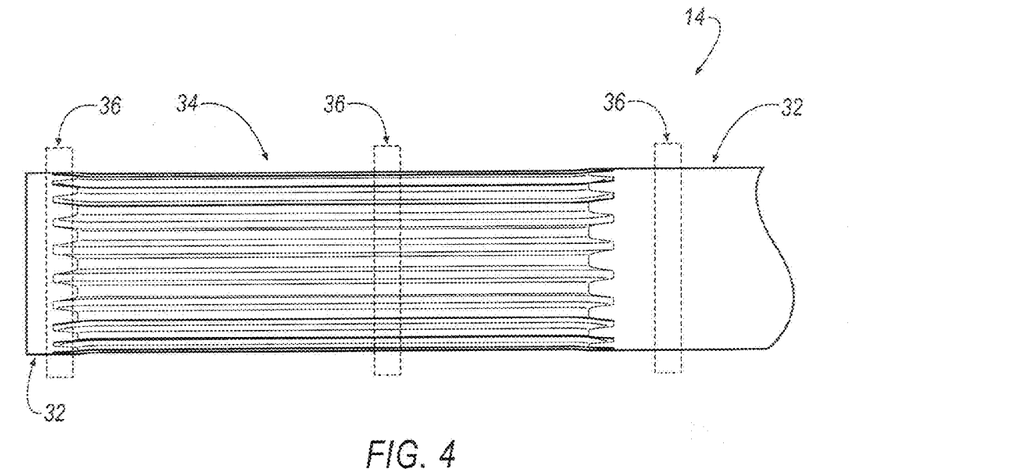
FIG. 4 is a side view of a propshaft assembly according to an embodiment of the invention.

As shown in FIG. 4, the exterior surface of the outer tube 14 may have one or multiple smooth portions 32 and one or multiple indentation portions 34. The indentation portion 34 is an outer surface that includes indentations 30 and ridges 31 that correspond to splines 28. The smooth portion 32 is a generally unremarkable surface that is located toward an end of the outer tube 14. Other configurations for the exterior surface of the outer tube 14 are contemplated in the embodiments of the invention.

With continued reference to FIGS. 1 and 4, a stiffening ring 36 according to an embodiment is shown and described. The stiffening ring 36 may be positioned over outer tube 14 at any location. For example, the stiffening ring 36 may be positioned over the smooth portion 32 or the indentation portion 34. The stiffening ring 36 may be constructed of any rigid material, such as metal, and adds additional strength or rigidity to the surface of the outer tube 14 over which it is located. In an embodiment, the stiffening ring 36 has at least a portion in direct contact with the outer surface of the outer tube 14. For example, if the stiffening ring 36 is positioned over the indentation portion 34, then in one embodiment, the ridges 31 would be in contact with a portion of the stiffening ring 36. Likewise, if the stiffening ring 36 is positioned over the smooth portion 32, then a portion of the stiffening ring 36 is in contact with that smooth portion 32. The stiffening ring 36 may be press fit, crimped, welded, or attached to the outer tube 14 by any technique.

Figure 5A:
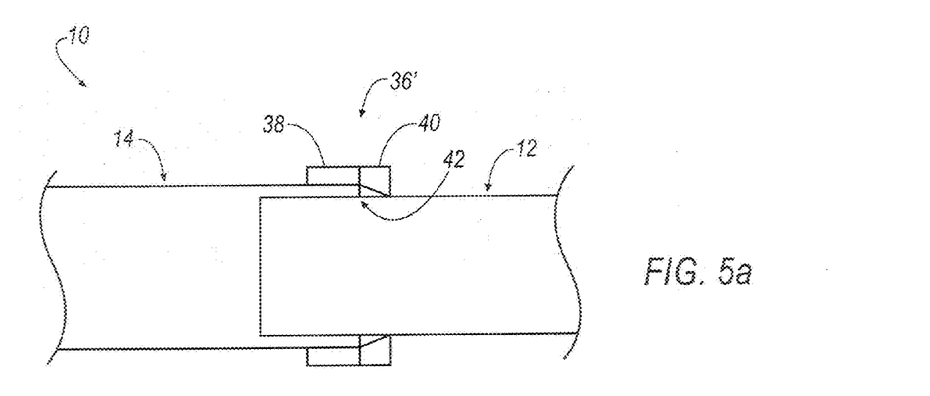
FIG. 5a is a schematic view of a propshaft assembly according to an embodiment of the invention.
Figure 5B:
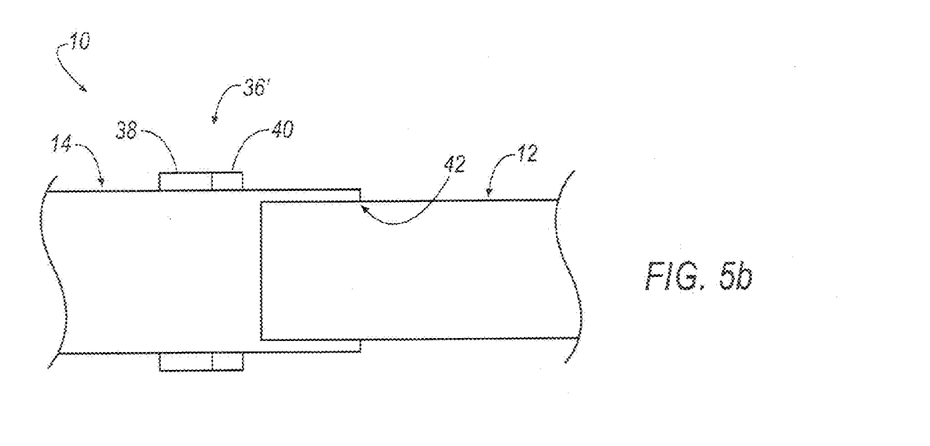
FIG. 5b is a schematic view of a propshaft assembly according to an embodiment of the invention.

Referring now to FIGS. 1, 5a and 5b, another embodiment of a propshaft assembly 10 with a stiffening ring 36' is shown and described. In FIG. 5a, the propshaft assembly 10 is shown having inner tube 12 positioned within the outer tube 14. The stiffening ring 36' is shown disposed over the outside of the outer tube 14 at a location proximate an engagement area 42 between the inner tube 12 and the outer tube 14. In an embodiment, the stiffening ring 36' includes a stiffening portion 38 and a seal portion 40. The stiffening portion 38 is a rigid material that adds strength to the outer tube 14 and the seal portion 40 is a sealing member that provides a sealing function as will be discussed.

With continued reference to FIG. 5a, the seal portion 40 is constructed of a sealing material and is positioned to seal an area proximate the stiffening portion 38 or where the outer tube 14 and inner tube 12 meet. The material from which the seal portion 40 is constructed may include rubber, polymers, or any other suitable material. As shown in FIG. 5b and FIG. 1, the stiffening portion 38 and seal portion 40 are positioned a distance from engagement area 42 at the end of the outer tube 14 and molds to the general shape, including indentations 30 and ridges 31, of the outer surface of the outer tube 14 (See FIG. 1).

In addition to adding rigid support to the outer tube 14 at the area where the stiffening ring 36, 36', 36", 36a", 36b", 36c", 36''' is located, by positioning the stiffening ring 36, 36', 36", 36a", 36b", 36c", 36''' at various locations, such as a specified distance from the engagement area 42, the overall moment and rotational characteristics, such as balance and moment, of the propshaft assembly 10 can be tuned for more suitable rotational characteristics. More specifically, by changing the location of the stiffening ring 36, 36, 36", 36a", 36b", 36c", 36''', the added rigidity and weight is repositioned to a different location along the propshaft assembly 10, thereby selectively tuning the rotational characteristics of the shaft assembly 10. In addition, radial expansion of the outer tube 14 can result in additional clearance between the splines of the inner tube 12 and the outer tube 14, which can reduce the balance and moment of the propshaft assembly 10. By use of the stiffening ring 36, 36', 36", 36a", 36b", 36c", 36''' of the invention, the radial expansion of the outer tube 14 is minimized at various locations, thereby modifying the potential imbalance due to additional clearance between the splines of the inner and outer tubes 12, 14.

Figure 6:
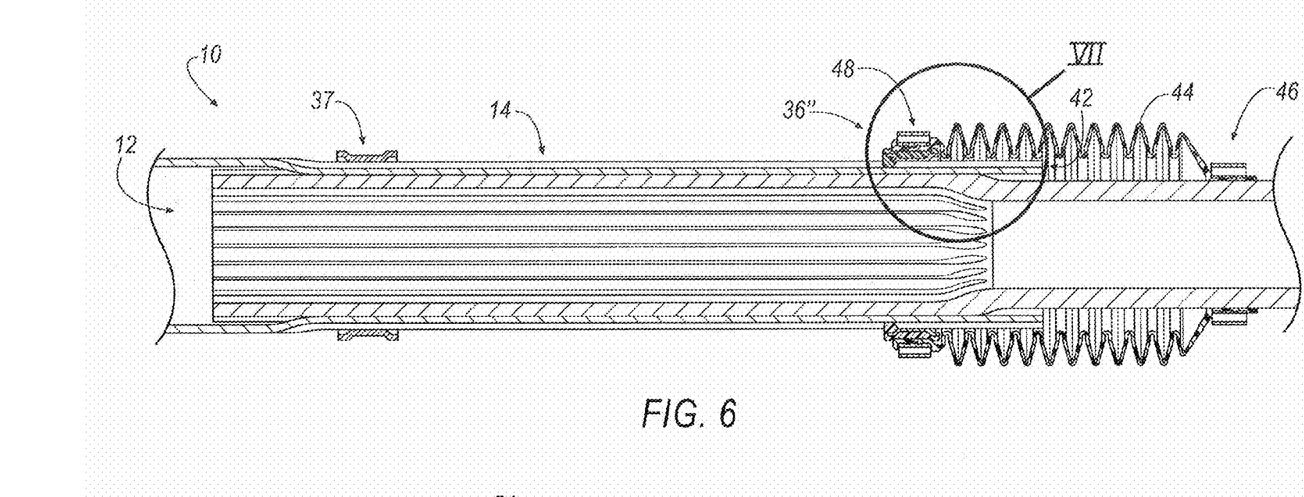
FIG. 6 is a partial cross-sectional view of a propshaft assembly taken along line VI-VI in FIG. 1 according to an embodiment of the invention.

Referring now to FIG. 6, another embodiment is shown and described. In the embodiment depicted in FIG. 6, the inner tube 12 and outer tube 14 are in a slip or plunging relationship, otherwise known as a slip spline. The depiction in FIG. 6 is a cross-section through VI-VI of the propshaft assembly 10 shown in FIG. 1. Here, a seal 44 is clamped at regions 46 and 48. The seal 44 is adapted to compress and retract in response to movement of the inner tube 12 with respect to the outer tube 14.

In one embodiment, the stiffening ring 36" is located at a distance from the engagement area 42 where the inner tube 12 and outer tube 14 overlap. However, it will be appreciated that the invention is not limited by the number of stiffening rings. As shown in FIG. 6, the propshaft assembly 10 may include one or more additional stiffening rings 37 located at any desired location where the splines of the inner tube 12 and outer tube 14 overlap, for example, at an opposite end from the stiffening ring 36". The use of one or more additional stiffening rings 37 at desired locations may further minimize the radial expansion of the outer tube 14 at various locations, thereby modifying the potential imbalance due to additional clearance between the splines of the inner and outer tubes 12, 14.

Figure 7:
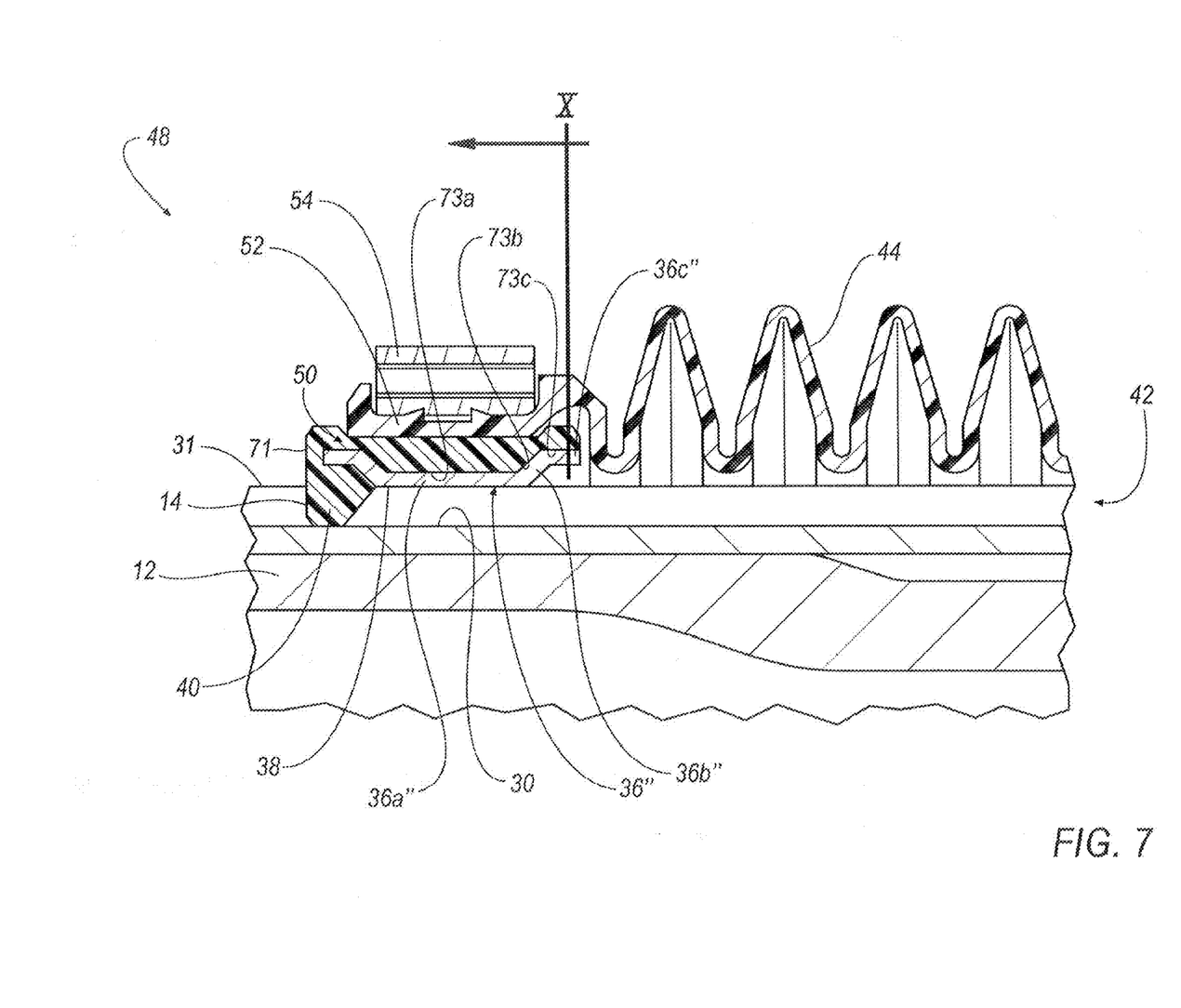
FIG. 7 is an enlarged view of a combination seal and stiffening ring designated as VII in FIG. 6 according to an embodiment of the invention.
Figure 10:
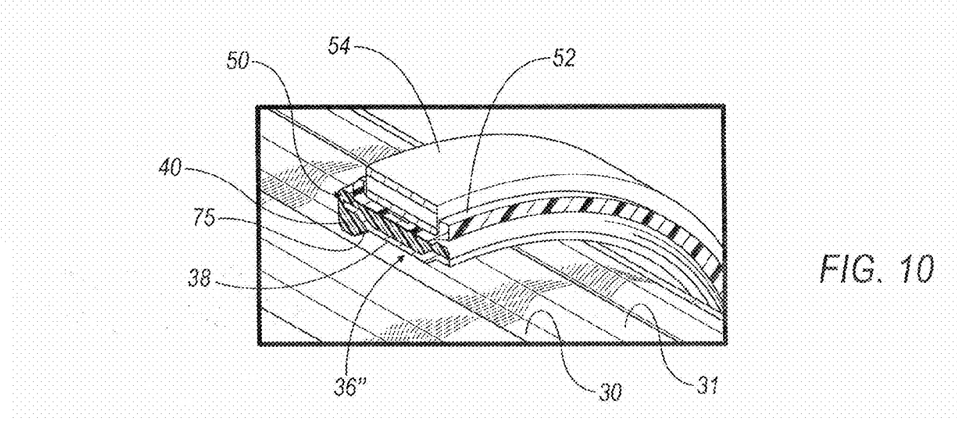
FIG. 10 is a partial perspective cross-sectional view of the seal and stiffening ring taken along line X in FIG. 7.

Referring now to FIGS. 7 and 10, the region 48 is shown in greater detail. In FIG. 7, a cross-section is shown passing through one of the indentations 30 (see FIG. 10). The stiffening ring 36" is shown having a first stiffening portion 36a" that extends generally parallel with respect to the inner tube 12 and outer tube 14. A second angled portion 36b" extends outwardly with respect to the longitudinal axis of the inner tube 12 and outer tube 14. A third portion 36c" extends generally parallel to the longitudinal axis and forms an area between the outer tube 14 and stiffening ring 36". The first portion 36a" is in direct contact with the outer tube 14 at the ridges 31. A seal portion 40 is positioned inside second portion 36b" and third portion 36c" and both the ridges 31 and indentations 30 of the outer tube 14 such that it maintains the form of the outer surface of the outer tube 14 as shown in FIG. 10.

A sealing member 50 is positioned over the stiffening portion 38. The sealing member 50 extends around the circumference of the outer tube 14 and includes a stub 71 that abuts against a vertical edge of the stiffening ring 38. The sealing member 50 also includes a first portion 73a that lies substantially horizontal on the first portion 36a" of the stiffening ring 36". The sealing member 50 also includes a second angled portion 73b that abuts against the second angled portion 36b" of the stiffening ring 36". The sealing member 50 also includes a third portion 73c that lies substantially horizontal on the third portion 36c". A portion 52 of the seal 44 is then clamped between the sealing member 50 and a sealing member 54. In an embodiment, the sealing member 54 is an adjustable clamp that can be selectively tightened around the circumference of the portion 52. The stub 71 provides a barrier for axial movement of the portion 52 of the seal 44 as shown. Therefore, seal portion 40 of seal member 50 maintains a seal between an area inside the seal 44 and the external environment.

As shown in FIG. 10, the seal portion 40 is attached to the stiffening ring 36". This attachment may be through molding the seal portion 40 directly onto the stiffening ring 36" or by any other attachment means known to one skilled in the art. The seal portion 40 generally includes flingers 75 and recessed regions (not shown). The flingers 75 generally extend into the indentations 30 while the recessed regions cover the ridges 31. The flingers 75 and recessed regions act to seal the varying geometry created by indentations 30 and ridges 31 and may be formed by simple compression of the seal portion 40 against the ridges 31 and indentations 30. Alternatively, the flingers 75 and recessed regions may be a purposeful design of the seal portion 40 to include the flingers 75 and recessed regions.

Figure 8:
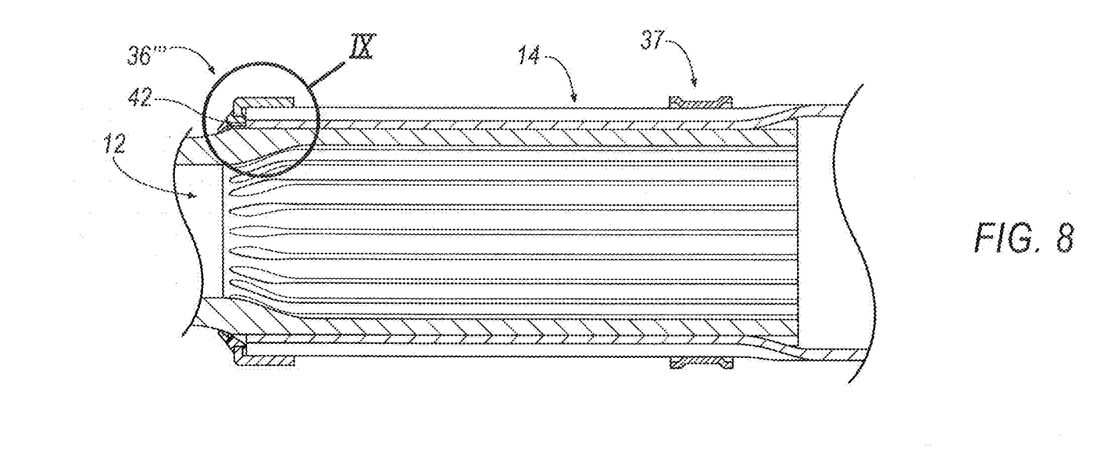
FIG. 8 is a partial cross-sectional view of a propshaft assembly according to an embodiment of the invention.
Figure 9:
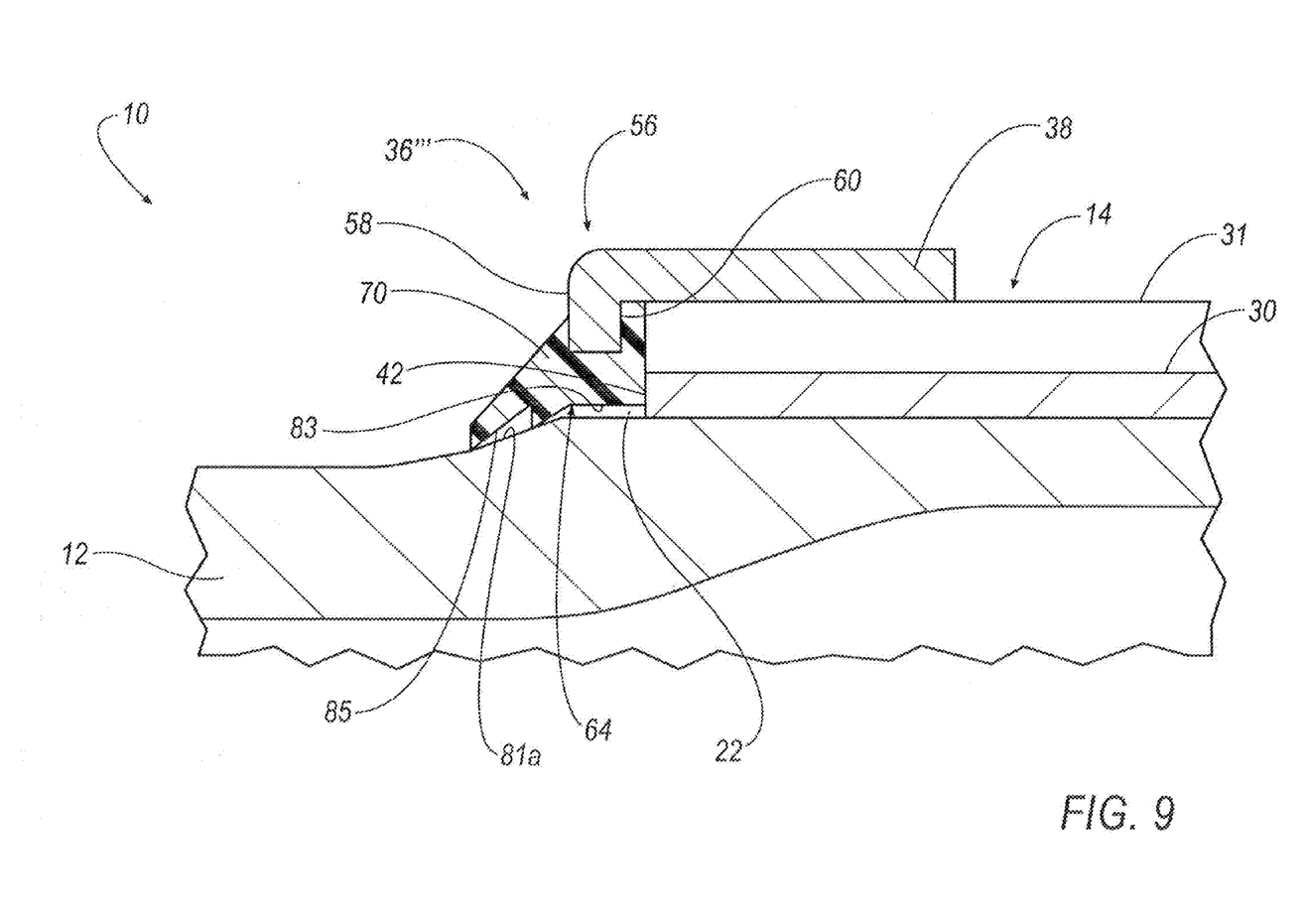
FIG. 9 is an enlarged view of the combination seal and stiffening ring designated as IX in FIG. 8 according to an embodiment of the invention.
Figure 11:
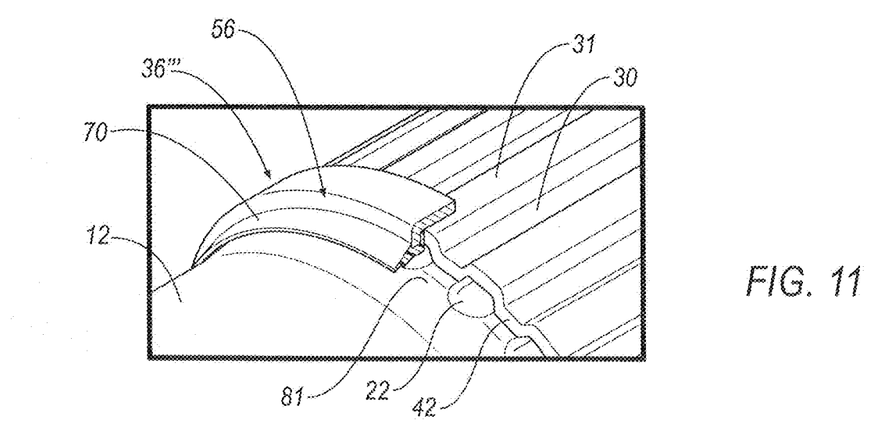
FIG. 11 is a partial perspective view of the combination seal and stiffening ring of FIG. 9 according to an embodiment of the invention.

Referring now to FIGS. 8, 9 and 11, another embodiment is shown and described. In FIG. 8, inner tube 12 is shown positioned in outer tube 14. In one embodiment, inner tube 12 is in an interference fit relationship with outer tube 14, commonly referred to as a locked spline. With this arrangement, stiffening ring 36′′′ is shown positioned proximate a mating region at engagement area 42 between the inner tube 12 and the outer tube 14. As shown in FIG. 9, which is a magnified view of IX in FIG. 8, the stiffening portion 38 generally extends horizontally beyond the outer tube 14 and has an end 56 that extends radially with respect to a longitudinal axis of the inner tube 12 and outer tube 14. A radially inward portion of the stiffening ring 36′′′, as shown in FIG. 11, is attached to ridges 31. This attachment may be in the form of an interference fit, weld, or any other techniques.

Similar to a slip spline arrangement, the lock spline arrangement is not limited by the number of stiffening rings. As shown in FIG. 8, one or more additional stiffening rings 37 may be located at any desired location where the splines of the inner tube 12 and outer tube 14 overlap, for example, at an opposite end from the stiffening ring 36′′′. The use of one or more additional stiffening rings 37 at desired locations may further minimize the radial expansion of the outer tube 14 at various locations, thereby modifying the potential imbalance due to additional clearance between the splines of the inner and outer tubes 12, 14.

End 56 further includes an outer face 58 and an inner face 60. A seal portion 70 is disposed around the outer face 58 and inner face 60 such that the inner face 60 compresses the seal portion 70 against the end of the outer tube 14 sealing the complete surface of the outer tube 14. The seal portion 70 prevents water and/or contamination from intrusion into the spline area, which can result in corrosion, and ultimately premature strength degradation of the assembly 10. This compression may occur when the stiffening ring 36′′′ is pressed fit onto the ridges 31. Additionally, the seal portion 70 includes an inner diameter 64 that presses against an outer surface of the inner tube 12, including both the flat region 81 and the splines 22. In an embodiment, the inner diameter 64 includes a first angled surface 83 and a second angled surface 85. The first angled surface 83 presses against the splines 22 and flat region 81. The second angled surface 85 primarily presses against the flat region 81 and a tapered location 81*a* where the inner tube 12 transitions between a larger and smaller radius.

The invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A propshaft assembly, comprising:
   a propshaft inner tube;
   a propshaft outer tube having an outer surface, an inner surface, and an end, the end splined to the inner tube thereby defining an engagement area between the inner tube and the outer tube;
   a first stiffening ring, wherein the first stiffening ring maintains the outer surface of the propshaft outer tube and reduces radial expansion of the propshaft outer tube, the first stiffening ring including a ring inner surface and a ring outer surface, the first stiffening ring is disposed around the propshaft outer tube, wherein at least a portion of the ring inner surface of the first stiffening ring is in direct contact with the propshaft outer tube, and at least a portion of the first stiffening ring inner surface generally circumferentially follows a contour of the propshaft outer tube outer surface; and
   a second stiffening ring disposed around the propshaft outer tube outer surface and axially spaced at a predetermined distance from the first stiffening ring for reducing radial expansion of the propshaft outer tube.

2. The propshaft assembly according to claim 1, wherein an outer surface of the propshaft outer tube includes a smooth portion.

3. The propshaft assembly according to claim 1, wherein at least one of the first stiffening ring and the second stiffening ring further comprises a seal portion.

4. The propshaft assembly according to claim 3, wherein the seal portion is disposed about the engagement area and is positioned against the end of the outer tube.

5. The propshaft assembly according to claim 1, wherein the propshaft outer tube and the propshaft inner tube are telescopingly arranged.

6. The propshaft assembly according to claim 1, wherein the stiffening ring is disposed about the engagement area and a portion of the stiffening ring extends beyond the end of the outer tube.

7. The propshaft assembly according to claim 1, wherein the inner tube and the outer tube have an interference fit.

8. A propshaft assembly, comprising:
   a propshaft inner tube including a plurality of axially extending splines;
   a propshaft outer tube splined to the propshaft inner tube to define an engagement area, the propshaft outer tube including an outer surface and an inner surface; and
   a stiffening ring disposed around and in direct contact with the propshaft outer tube and having a stiffening portion, the propshaft outer tube outer surface and the propshaft outer tube inner surface having a corresponding contour within at least a portion of the stiffening ring, where the stiffening ring is constructed from a metal based material, and wherein the stiffening ring maintains a propshaft outer tube diameter and reduces radial expansion of the propshaft outer tube within at least a portion of the engagement area.

9. The propshaft assembly according to claim 8, wherein an outer surface of the propshaft outer tube has an indentation portion.

10. The propshaft assembly according to claim 9, wherein the stiffening ring is in contact with at least a portion of the indentation portion.

11. The propshaft assembly according to claim 8, wherein an end of the propshaft outer tube is splined to an end of the propshaft inner tube at the engagement area.

12. The propshaft assembly according to claim 11, wherein the seal portion is positioned against the end of the outer tube.

13. The propshaft assembly according to claim 11, wherein a portion of the stiffening ring extends beyond the end of the outer tube.

14. The propshaft assembly according to claim 8, wherein an outer surface of the propshaft outer tube includes a smooth portion.

15. The propshaft assembly according to claim 14, wherein the stiffening ring is in contact with at least a portion of the smooth portion.

16. The propshaft assembly according to claim 1, wherein the stiffening ring and the propshaft outer tube include an interference fit.

17. The propshaft assembly according to claim 8, further comprising a seal portion disposed around the propshaft outer tube.

18. The propshaft assembly according to claim 8, wherein at least a portion of the stiffening ring is fixedly attached to the outer surface of the propshaft outer tube.

19. The propshaft assembly according to claim 18, wherein the stiffening ring is attached by one of a weld, crimp, and a press fit.

* * * * *